(12) United States Patent
Silberman et al.

(10) Patent No.: US 10,402,723 B1
(45) Date of Patent: Sep. 3, 2019

(54) MULTI-STAGE MACHINE-LEARNING MODELS TO CONTROL PATH-DEPENDENT PROCESSES

(71) Applicant: Cerebri AI Inc., Austin, TX (US)

(72) Inventors: Gabriel M. Silberman, Austin, TX (US); Alain Briançon, Germantown, MD (US); Gregory Klose, Austin, TX (US); Michael Wegan, East Lansing, MI (US); Lee Harper, Austin, TX (US); Andrew Kraemer, Austin, TX (US); Arun Prakash, Austin, TX (US)

(73) Assignee: Cerebri AI Inc., Austin, TX (US)

( * ) Notice: Subject to any disclaimer, the term of this patent is extended or adjusted under 35 U.S.C. 154(b) by 0 days.

(21) Appl. No.: 16/127,933

(22) Filed: Sep. 11, 2018

(51) Int. Cl.
   *G06F 15/18* (2006.01)
   *G06N 3/08* (2006.01)
   *G06N 3/04* (2006.01)

(52) U.S. Cl.
   CPC ........... *G06N 3/08* (2013.01); *G06N 3/0445* (2013.01); *G06N 3/0454* (2013.01)

(58) Field of Classification Search
   CPC ...................................... G06N 20/00
   USPC ........................................ 706/15, 45
   See application file for complete search history.

(56) References Cited

U.S. PATENT DOCUMENTS

| | | |
|---|---|---|
| 2012/0054019 A1 | 3/2012 | Kitts et al. |
| 2017/0177995 A1 | 6/2017 | Hillar et al. |
| 2017/0220925 A1 | 8/2017 | Alsharif et al. |
| 2017/0227673 A1 | 8/2017 | Venugopalan et al. |
| 2017/0316453 A1 | 11/2017 | Kitagishi |
| 2017/0330058 A1 | 11/2017 | Silberman et al. |
| 2017/0330205 A1 | 11/2017 | Belanger et al. |
| 2018/0129970 A1 | 5/2018 | Gottschlich et al. |
| 2018/0150757 A1 | 5/2018 | Aggarwal et al. |
| 2018/0165604 A1 | 6/2018 | Minkin et al. |
| 2018/0225588 A1 | 8/2018 | Khidekel et al. |
| 2018/0255383 A1 | 9/2018 | Cella et al. |

*Primary Examiner* — David R Vincent
(74) *Attorney, Agent, or Firm* — Pillsbury Winthrop Shaw Pittman LLP

(57) ABSTRACT

Provided is a process, including: obtaining a first training dataset of subject-entity records; training a first machine-learning model on the first training dataset; forming virtual subject-entity records by appending members of a set of candidate action sequences to time-series of at least some of the subject-entity records; forming a second training dataset by labeling the virtual subject-entity records with predictions of the first machine-learning model; and training a second machine-learning model on the second training dataset.

22 Claims, 3 Drawing Sheets

MULTI-STAGE MACHINE-LEARNING MODELS TO CONTROL PATH-DEPENDENT PROCESSES

CROSS-REFERENCE TO RELATED APPLICATIONS

No cross-reference is presented at this time.

BACKGROUND

1. Field

The present disclosure relates generally to computer-learning and, more specifically, to training a machine-learning model to control path-dependent processes.

2. Description of the Related Art

A variety of techniques are used to control or otherwise influence processes that unfold over time. Many of these approaches seek to drive or otherwise induce a subject, such as an industrial process, a robot, a human, or other complex (and often stochastic) system, into a targeted state as quickly and efficiently as possible. Examples include relatively simple proportional-integral-derivative controllers and more complex approaches, like Markov decision processes. Often, these systems operate with some amount of uncertainty as to the state of the system, and in some cases, a sequence of actions needed to achieve the targeted state is relatively complex.

Existing computational techniques often fail to predict whether a given act will influence a subject to behave in a desired manner. As a result, computer-implemented control systems seeking to influence behavior of targeted subjects often select the wrong act and apply sub-optimal types of interventions to some members of that population of subjects, reducing effectiveness of the process. In many cases, these errors arise from a failure to account some types of controlled subject-entity's tendency to change over time, often in a path-dependent manner.

SUMMARY

The following is a non-exhaustive listing of some aspects of the present techniques. These and other aspects are described in the following disclosure.

Some aspects include a process, including: obtaining, with one or more processors, a first training dataset, wherein: the first training dataset comprises a plurality of subject-entity records, the subject-entity records each describe a different subject entity, each subject entity is a different member of a first population of entities that have interacted over time with an actor entity, each subject-entity record describes attributes of a respective subject entity among the first population, each subject-entity record describes a time-series of events involving a respective subject entity among the first population, the events are distinct from the attributes, at least some of the events are action events that are caused by the actor entity, and at least some of the events are subject responses that are caused by a respective subject entity among the first population; training, with one or more processors, a first machine-learning model on the first training dataset by adjusting parameters of the first machine-learning model to optimize a first objective function that indicates an accuracy of the first machine-learning model in predicting subsequent events in the time-series given prior events in the time-series and given attributes of subject entities among the first population; obtaining, with one or more processors, a set of candidate action sequences including candidate action events to be potentially caused by the actor entity, the set including a plurality of different candidate action sequences; forming, with one or more processors, virtual subject-entity records by appending the set of candidate action sequences to time-series of at least some of the subject-entity records, wherein: a given subset of the virtual subject-entity records includes a plurality of virtual-subject entity records that each include at least part of a time-series from the same subject-event record in the first training dataset, and at least some of the plurality of virtual-subject entity records in the given subset each have a different member of the set of candidate action sequences appended to the at least part of the time-series from the same subject-event record in the first training dataset; forming, with one or more processors, a second training dataset by: predicting responses of the subject entities to at least some of the set of candidate action sequences with the trained first machine-learning model based on the virtual subject-entity records; and associating subject entities or attributes thereof with corresponding predicted responses in the second training dataset; training, with one or more processors, a second machine-learning model on the second training dataset by adjusting parameters of the second machine-learning model to optimize a second objective function that indicates an accuracy of the second machine-learning model in predicting the predicted responses in the second training set given attributes of subject entities corresponding to the predicted responses; and storing, with one or more processors, the adjusted parameters of the trained second machine-learning model in memory.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
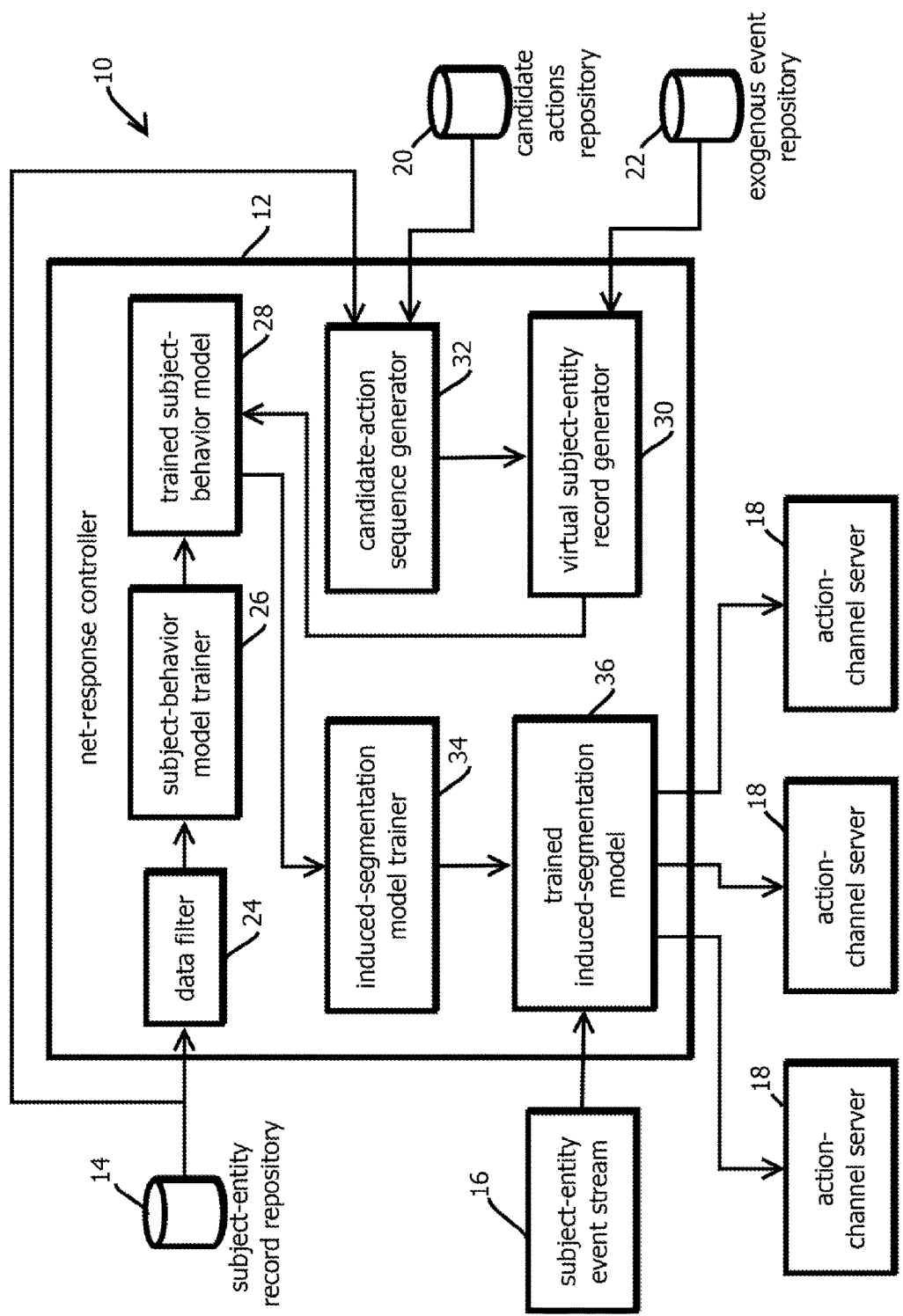
FIG. 1 is a block logical and physical architecture diagram showing an embodiment of a net-response controller in accordance with some of the present techniques.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of machine learning. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

To mitigate the above-described (or other) challenges, some embodiments account for subject-entity path-dependency on an individualized basis with a model trained on historical sequences of events. In some cases, the model indicates a likelihood of the subject-entity engaging in each of a targeted set of one or more behaviors, like moving a sub-sea robot with a tether into a targeted position; influencing humans to recycle, seek a health checkup, exercise, buy a product, recommending a product or brand to another; or cause a heating-ventilation and air conditioning (HVAC) system of a datacenter with temperature-dependent load balancing to attain a targeted temperature; for instance, within a threshold duration of time in the future. In some cases, the model outputs these likelihood-scores given (e.g., responsive to input of) both a sequence of events experienced by that subject-entity (e.g., robot, human, or datacenter) in the past and a candidate virtual sequence of actions that includes one or more candidate interventions to be applied in the future. Models may take a variety of forms, including Dynamic Bayesian Networks (such as hidden Markov models, like a 2, 3, 4, or more level HMM), recurrent neural networks (like long short-term memory (LSTM) models), Markov decision processes, and reinforcement learning models.

In some cases, the likelihood-scores for the different targeted environmental states (e.g., responses of subject entities being controlled) are weighted by respective utilities (or dis-utilities) associated with the different behaviors, e.g., a particular route through a sub-sea environment for a robot may be more energy efficient; or a purchase of one product may be more highly valued than another, which may be more highly valued than a referral, while a negative online review may have negative utility. In some cases, the utility-weighted likelihood scores are summed (or otherwise aggregated) to produce an expected utility of the candidate virtual set of actions directed at the subject entity. Thus, each unique combination of an individual and candidate virtual controlling actions may yield an individualized expected utility of the candidate virtual set of actions directed at the subject entity by a control process. In some cases, individualized expected utilities may be aggregated across the population to determine an aggregate expected utility of the candidate set of actions.

In some cases, acts in a candidate set to be applied by a control process may have associated therewith a utility as well, like a cost associated with advertising or offering a discount that is expressed as a negative utility value. In some cases, these utilities may be summed with the likelihood-weighted utilities to determine the expected utilities Some embodiments execute "what-if" analysis on sequences of actions to be applied by a process to control or otherwise influence behavior of a subject entity. In some embodiments, several (e.g., a systematically generated set of) candidate virtual campaigns (e.g., sets of actions to be applied by a control process to influence a subject entity) are tested with the model to product utility-weighted likelihood scores for each of the different behaviors for each individual subject entity. Test results may be applied to a variety of ends: the individual subject-entities may be placed in a population sub-group (e.g., a segment) based on which candidate virtual campaigns score well; a candidate virtual campaign may be selected based on aggregate performance indicated by these scores for a population; or steps in candidate virtual campaigns may be modified (e.g., attributes thereof may be added, enhanced, reduced, changed, or deleted) based on differences between tests that isolate predicted effects of those steps or attributes.

In some cases, testing every member of the set of all possible campaigns for all individual subject entities is computationally infeasible, particularly if sequence lengths are unbounded. To mitigate this issue, some embodiments select a set of candidate virtual campaigns to test based on the historical sequences, e.g., selecting one of each unique subset of sequences of events terminating in a targeted behavior and including at least one endogenous intervention (e.g., an act caused by the entity seeking to influence behavior). Thus, some embodiments may limit testing to only candidate virtual campaigns having sequences like those that have occurred in the past. This is expected to substantially reduce the computational complexity of the analysis.

In some embodiments, a given candidate virtual campaign is tested multiple times with different intermingled exogenous events, e.g., weather, sporting outcomes, and the like, and results are combined, e.g., in a weighted sum with weights corresponding to the probability of the exogenous events occurring. Some embodiments may execute a Monte Carlo analysis of these different scenarios, in some cases, with varying probabilities of endogenous events conditional on exogenous events. In some cases, the model also accounts for non-event attributes of subject entities, like mechanical capabilities of robots, demographic and psychographic attributes of individual people, or thermal attributes of a building subject to HVAC control, or different models may be trained on different segments of the population defined according to these attributes.

Some embodiments may configure campaigns with reinforcement learning, e.g., by assigning the models configured for each individual subject entity to the role of the environment and assigning the role of the agent to a routine that optimizes attributes of campaigns or population segmentation based on the behavior of the environment responsive to a current candidate campaign being tested. Some embodiments may assign the agent an objective function that maximizes the aggregate expected utility.

In some embodiments, these and other techniques may be implemented with a net-response controller 12 operating within a computing environment 10 shown in FIG. 1. In some embodiments, the computing environment 10 may further include a subject-entity record repository 14, a subject-entity event stream 16, a plurality of action-channel servers 18, a candidate action repository 20, and an exogenous event repository 22.

A variety of different computing architectures are contemplated. In some embodiments, some or all of the components of the computing environment 10 may be hosted by different entities, for instance in remote datacenters that communicate via the Internet or other networks, or in some embodiments, some or all of the components of the computing environment 10 may be co-located within a network of a single entity, for instance co-located in a single datacenter. In some embodiments, the computing environment 10 and the components thereof may be implemented as a monolithic application, for instance, with different illustrated components implemented as different software modules or processes that communicate with one another, for instance via function calls, or in some cases, some or all of the components may be implemented as different processes executing concurrently on a single computing device. In some embodiments, some or all of the illustrated components may be implemented as distinct services executing on different network hosts that communicate with one another via messages exchanged via network stacks of the respective hosts, for instance, according to application program interfaces of each of the distinct services. In some embodiments, some or all of these services may be replicated, for instance, behind load balancers, to afford a relatively scalable architecture, in some cases, with elastic scaling that automatically spins up or down new instances based on load. Some embodiments implement a service-oriented architecture, such as a micro services architecture, with different services hosted on virtual machines or containers executing images corresponding to different services, in some cases, with some services implemented in a serverless architecture, for instance, as lambda functions.

In some embodiments, the net-response controller 12 may be configured to execute the process described below with reference to FIG. 2. In some embodiments, the net-response controller 12 is operative to train models that account for the above-described dynamic path dependency behavior of an environment in which actions selected by the model are taken, in some cases under uncertainty, and in some cases, with stochastic responses from the environment. In some embodiments, the trained model may be operative to select such actions with a subset of the information that is available when training, for instance, with a subset of features about a current state of the environment for which an action is to be chosen in pursuit of an objective.

The role of the environment and the entity taking actions may take a variety of forms. Examples include scenarios in which a sequence of actions taken over time induce a path-dependent state of the environment, for instance, a sub-sea robot selecting a next navigation action after a history of navigation actions that have induced a state of the robot's tether to the surface supplying power, an entity seeking to cause a population of people to engage in some behavior by taking marketing-related actions after a history of events experienced by those people, and an industrial process control system managing the HVAC system of a datacenter in which a history of the temperature may cause compute-load-balancing (and as a result, a time-delayed thermal load shift) between datacenters to occur in a path-dependent manner.

In some embodiments, the environment is characterized by a respective one of a plurality of subject-entity records in the subject-entity record repository 14. In some embodiments, the environment may be one of a relatively large number of independent entities for which actions are selected to influence behavior, such as different people in a population, or in some embodiments, the environment may be a single entity, for instance, a physical state of a robot and its tether. Or in some cases, the role of the environment may be served by a relatively small number of interacting entities, such as a set of datacenters among which load is balanced and for which HVAC systems are being controlled. In some embodiments, the number of subject entities in a population of people may be more than 1000, more than 10,000, more than 100,000, and in many commercially-relevant use cases, more than a million.

In some cases, each of the subject entity records may include a timeseries of events experienced by the corresponding subject entity, such as person, robot, or datacenter. In some cases, the events may include actions taken by a system controlled by the net-response controller 12 at the direction of the net-response controller 12 based upon a trained model thereof. Examples include directing a thruster in a particular direction and applying a particular amount of thrust for a duration of time in the example of a subsea robot. Other examples include sending an email, causing an advertisement exposure, sending a coupon or discount offer, calling a person, sending a text message, adjusting a price for a particular person, adding a task to a customer-relationship management (CRM) system, or the like in the example of members of a population to be influenced. In the example of a control system for a datacenter HVAC system, examples include applying a particular set point for temperature or humidity for some duration of time, setting a fan speed for some duration of time, adjusting a balance between external and internal air recirculation, and the like.

In some cases, the events may include actions taken by nonhuman subjects, for instance, actuating a thruster in a particular direction for a particular duration, or undertaking a computing load in a datacenter for some duration. In some cases, the events may include actions taken by different subjects, for instance, people navigating to a website of a merchant, calling a help center of a merchants, contacting a salesperson of a merchant, clicking on an advertisement of a merchant, engaging with a native application of a merchant, physically visiting a storefront of a merchant, being exposed to an advertisement, submitting a review classified as having a particular sentiment among a plurality of different types of sentiments, or the like.

In some embodiments, the events may further include exogenous events, which are events that are not caused by the net-response controller 12 or the subject entity, but to which the subject entity is exposed or potentially exposed. Examples include phenomena like the weather, ocean currents, and contact by sea creatures in the example of a subsea robot. Other examples include phenomena like recessions, changes in interest rates, and other macro-economic phenomena, along with cultural phenomena, like sporting events, holidays, the Olympics, elections, and the like in the example of members of a human population to be influenced. In some embodiments, the exogenous events are stochastic, and some embodiments may associate with exogenous events an estimated or known probability distribution, like likelihoods of occurring within threshold durations of time.

In some cases, records describing histories of events experienced or potentially experienced by subjects are stored in the subject-entity record repository 14 in subject-entity records. In some embodiments, each subject-entity record may correspond to a different subject, such as a different robot, person, or datacenter. In some embodiments, each subject-entity record may have associated therewith a unique identifier of the subject, in some cases a pseudonymous identifier.

In some embodiments, each subject-entity record may further include attributes of the subject, like a maximum amount of thrust available in a subsea robot, a range of thruster angles available in such a robot, drag of the robot, and inertial properties of a tether. In another example, the attributes may include attributes of people, like psychometric or demographic attributes, like age, gender, geolocation of residence, geolocation of a workplace, income, number and age of children, whether they are married, and the like. In some embodiments, the attributes may include attributes of a datacenter, for instance, a cooling capacity, an inventory of HVAC equipment therein, a volumetric flow rate maximum for fans, and the like. In some cases, such attributes may include values indicating transient responses to stimulus as well.

In some embodiments, each subject-entity record may further include a timeseries of events experienced by the subject-entity or potentially experienced by the subject entity, such as exogenous events that may or may not have impinged upon the subject entity. In some cases, the time series of events are stored in a format that indicates a sequence of the events, for instance with timestamps of each event, or some embodiments may indicate sequence but not time, which is not to suggest that any other described feature is limiting. In some embodiments, the number of events may be relatively large, such as more than 10, more than 100, or more than 1000 on average for the collection of subject entities for which records are stored in the repository 14. In some embodiments, events may be associated with a confidence score indicative of a confidence that the event occurred or was experienced by the respective subject entity. In some embodiments, events may have other attributes, like an intensity of the events, a monetary value of the events, a dwell time on a website, a value indicating whether a person clicks through to an advertisement, and the like for use cases in which humans are the subject. Similarly, events for robots or datacenters may include, for example, a thermal load applied in a datacenter, an amount of current experience and by a subsea robot, and the like. In some embodiments, the events may be arranged in an ontology or a hierarchical taxonomy.

In some embodiments, a value mapping the event to an entry in a taxonomy may indicate whether the event is an action taken by the subject-entity being controlled, an exogenous event, or an act upon the subject-entity at the direction of the net-response controller or other system to be controlled by the net-response controller. In some embodiments, events corresponding to actions by the subject-entity may have attributes indicating whether the respective event is advancing a goal, such as a goal reflected in an objective function composed by a developer to effectuate the goal. Examples include an attribute of a robot movement event indicating whether the robot movement event resulted in the robot moving closer to an objective, an attribute of a consumer event indicating whether the consumer purchased a product, an attribute of a user event indicating with the user engaged in some other desired behavior, like recycling or getting a health checkup, or an attribute of a datacenter event indicating whether a datacenter remains within a targeted band of temperature for a targeted duration of time. In some embodiments, the event attributes may not express whether such attributes are good or bad, merely provide a metric that may be interpreted with, for example, a reward function of the net-response controller 12. In some embodiments, the reward function may be a part of an objective function, or some embodiments may apply other types of objective functions that do not include a reward function, which is not to suggest that any other description is limiting.

In some embodiments, the subject-entity records are or include the event timelines described in U.S. patent application Ser. No. 15/456,059, titled BUSINESS ARTIFICIAL INTELLIGENCE MANAGEMENT ENGINE, the contents of which are hereby incorporated by reference.

In some embodiments, the net-response controller 12 may train a first model based on the subject-entity records, and that first model may be used by the net-response controller 12 to generate a virtual training set that includes predicted responses to candidate actions. The virtual training set may then be used by the net-response controller 12 to train a second model by which state of subject entities is mapped to actions, such as actions within the set of candidate actions, as described in greater detail below with reference to FIG. 2. In some cases, the first model may be a model of the environment in a reinforcement learning architecture, or in some cases, the first model may integrate both a model of the environment and a value function in such an architecture.

In some embodiments, the state to which the net-response controller 12 is responsive (e.g., in online use cases after training) may be ingested in a subject-entity event stream 16. In some embodiments, after the models are trained, subsequent subject-entity records, events thereof, or attributes thereof may be ingested via the subject-entity event stream 16. In some embodiments, this event stream may be a stream of readings from sensors of a robot, such as inertial measurement unit sensors or range finding sensors. In some cases, the event stream may be attributes of additional members of a population to be influenced or a new population to be influenced, or in some cases attributes of events in an event history thereof. In some embodiments, the event stream may be temperature or load assignment signals from a datacenter. In some cases, the ingested stream of data may have associated therewith identifiers like those described above distinguishing different subjects controlled and associated with the inbound events or attributes. In some embodiments, the stream may be a batch process, such as a set of records of subject entities that are members of a population for which a new campaign is being designed to influence the members of the population to engage in some targeted behavior. In some embodiments, the stream may be a real time stream, for instance, with data being supplied as it is obtained by, or in relation to, subject entities, for instance, in queries sent as the data is obtained to request a recommended responsive action in view of the new information.

In some embodiments, latency requirements may be relatively strict in real-time online use cases. For example, some embodiments may respond within less than 200 msec to such a query, for instance, within less than 50 msec. Or some batch processes may be less time sensitive.

In some embodiments, the scale of batch processes may be relatively large, for instance, involving more than 10,000, more than 1 million, or more than 10 million different subjects for which responsive actions are to be determined in view of the newly ingested information. In some embodiments, the subjects in the event stream 16 are the same as those in the subject entity record repository 14, and in some cases the same external system may serve both roles. In some cases, the subjects may overlap between the two sets of the records 14 and the stream 16. In some cases, there may be no overlap in the two sets of subjects.

In some embodiments, the output of the net-response controller 12 may effectuate various types of actions that impinge or potentially impinge upon the subjects giving rise to the information in the event stream 16, in some cases in response to receiving information about those subjects, for example, in response to an application program interface request including a subject-entity record like that described above and seeking a recommended next action. In some cases, those actions may be effectuated via various channels 18, such as via different action-channel servers. In some cases, the role of these components may be filled by a network-connected server configured to send messages (e.g., to computing devices by which humans communicate or to actuators in mechanical systems), in some cases with a different type of messages being sent by each of the different action-channel servers 18, for example, supervisory control and data acquisition (SCADA) requests to adjust HVAC equipment, requests on a robots command bus to servomotors to adjust speed or direction of thrusters, or emails sent via email servers, text messages sent via text message servers, messages sent creating tasks in a customer-relationship management CRM system to contact a particular customer, messages sent to a printer that cause mailers to be printed, messages sent to a at auction server with a bid on an advertisement, a website server that customizes content for a particular customer's user account, and the like.

In some embodiments, the net-response controller 12 is configured to score (or otherwise select) candidate actions responsive to information in the stream 16 with the trained model. In some cases, those candidate actions are stored in a candidate-action repository 20, for instance, in a data structure that includes a plurality of candidate actions that the net-response controller 12 may cause to be effectuated via one of the action-channel servers 18. The term "repository" is used broadly to include structured arrangements of data, such as in relational databases, NoSQL databases, data structures in program state (like key-value pairs, objects in an object oriented programming language, arrays, lists, and the like), documents (like hierarchical serialization data format documents, such as JavaScript object notation or extensible markup language documents), and the like.

In some embodiments, the number of candidate actions may be crafted to leverage human intuition to reduce the space of possible actions and expedite processing. For example, a human may recognize that directing two thrusters in opposite direction such that there thrust vectors are aligned wastes power, and that action may be culled from the candidate actions in the repository. In another example, a human may recognize that a population is likely to be influenced in a cost-effective manner with one of 10 different types of actions, and the universe of candidate actions may be limited to those 10 different actions in the repository 20 through composition of such actions by a human providing input. Similarly, candidate actions in a datacenter HVAC control system may be constrained by, for example, a human's knowledge that an air conditioner and heater should not be run at the same time. Reducing the search space for an optimal mapping of candidate actions to subject-entity state is expected to conserve computing resources, lead to lower latency responses, and reduce the likelihood of optimizations resulting in a local optimum rather than a global optimum.

In some embodiments, the selected action is effectuated by another computer system disposed between the net-response controller 12 and the candidate action-channel servers 18. In some embodiments, the net-response controller 12 outputs a selected candidate action, or in some cases, the net-response controller 12 outputs a plurality of proposed actions with associated scores indicating the estimated likelihood of those actions advancing a goal around which objective functions of the controller 12 are designed. In some embodiments, an intermediary computer system may select an action based upon these scores, for instance selecting, a highest scoring action, or in some cases combining the score with other signals to determine a subsequent action from among a plurality of candidates based on a ranking according to the combined signals (like a weighted sum). In some embodiments, the actions include those described as being selected among in U.S. patent application Ser. No. 15/456,059, titled BUSINESS ARTIFICIAL INTELLIGENCE MANAGEMENT ENGINE, the contents of which are hereby incorporated by reference.

In some embodiments, records specifying candidate actions may further include a classification of the candidate action in the above-described taxonomy or ontology. Further, such records may include a cost or reward associated with the candidate action, in some cases being expressed in terms of battery power consumed, time consumed, or money consumed by effectuating the action. In some cases, such costs may be expressed as probabilistic distributions in the records, and some embodiments may be configured to operate upon an expectancy based upon those distributions.

In some embodiments, information about exogenous events may be hand coded or otherwise input via the exogenous event repository 22. In some cases, the exogenous event repository 22 may include a plurality of different records corresponding to different types of exogenous events and probabilities thereof. In some cases, the probabilities are conditional probabilities, for instance, a plurality of conditional probabilities conditional on respective ones of a plurality of other events.

Figure 2:
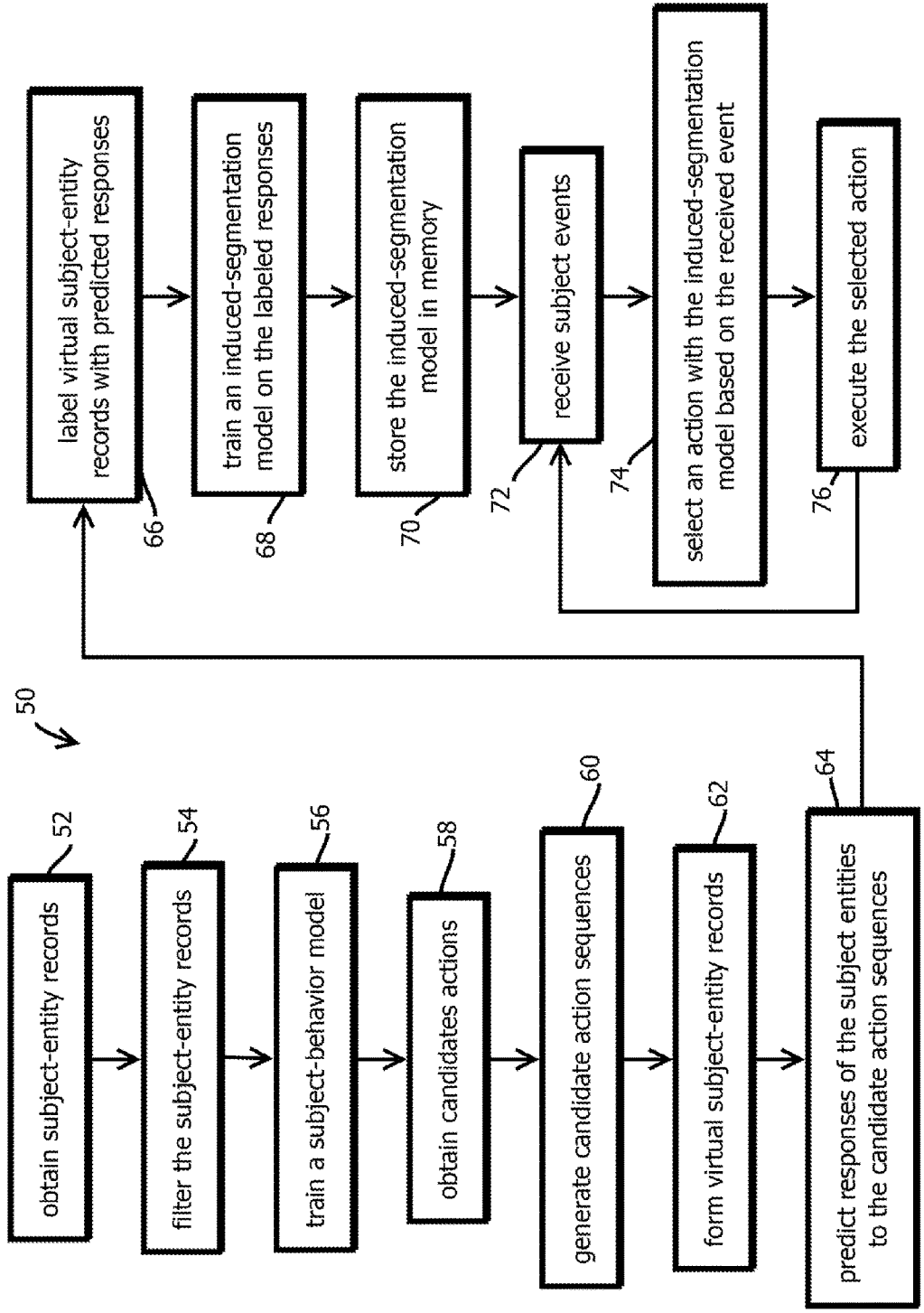
FIG. 2 is a flowchart showing an example of a process by which subsequent actions are selected based on a current state of an environment under uncertainty in accordance with some embodiments of the present techniques.

As noted, some embodiments of the net-response controller 12 may execute a process 50 shown in FIG. 2. In some embodiments, different subsets of this process 50 may be executed by the illustrated components of the net-response controller 12, so those features are described herein concurrently. It should be emphasized, though, that embodiments of the process 50 are not limited to implementations with the architecture of FIG. 1, and that the architecture of FIG. 1 may execute processes different from that described with reference to FIG. 2, none of which is to suggest that any other description herein is limiting.

In some embodiments, the process 50 and the other functionality described herein may be implemented with program code or other instructions stored on a tangible, non-transitory, machine-readable medium, such that when the instructions are executed by one or more processors (a term which as used herein refers to physical processors, e.g., implemented on a semiconductor device), the described functionality is effectuated. In some embodiments, notwithstanding use of the singular term "medium," the medium may be distributed, with different subsets of the instructions stored on different computing devices that effectuate those different subsets, an arrangement consistent with use of the singular term "medium" along with monolithic applications on a single device. In some embodiments, the described operations may be executed in a different order, some or all of the operations may be executed multiple times, operations may be executed concurrently with one another or multiple instances of the described process, additional operations may be inserted, operations may be omitted, operations may be executed serially, or the processes described may otherwise be varied, again none of which is to suggest that any other description herein is limiting.

In some embodiments, the process 50 includes obtaining subject-entity records, as indicated by block 52, and filtering the subject-entity records, as indicated by block 54. In some embodiments, these operations may be performed by a data filter 24 shown in FIG. 1. In some embodiments, the obtained subject-entity records may be obtained from the subject-entity record repository 14. Filtering may take a variety of different forms. Some embodiments may filter out those records lacking a targeted action of the subject entity (e.g., removing those having a value less than a threshold in a value function), like navigating a robot to a designated place, causing a person to make a specified purchase, causing a person to recycle, or maintaining a datacenter HVAC system within a designated temperature range. In some embodiments, subject-entity records that do not include a target action may be filtered out and omitted from subsequent processing, thereby reducing the universe of subject-entity records to process and expediting operations. Some embodiments may further filter out subject-entity records in which a targeted event is not preceded by an event caused by the net-response controller 12 or system to be directed to effectuate actions by the net-response controller 12, thereby filtering out records that do not potentially reflect a causal relationship. Or some embodiments may include both those subject-entity records that include these types of events and those that do not. In some embodiments, the data filter 24 may further compress the data that is ingested by removing duplicate records, such as records that are identical but for a subject identifier, and some embodiments provide the resulting filtered de-duplicated records to subsequent processing in a data pipeline like that shown.

Some embodiments may train a subject-behavior model, as indicated by block 56, for example with the subject-behavior model trainer 26 of FIG. 12. Various types of training may be implemented, depending upon the type of model. In some embodiments, the model is a supervised machine learning model subject to offline training, or in some cases, such as those in which the search space of candidate actions is relatively large, the model may be a reinforcement learning model. Specific examples of each are described below.

In some embodiments, the model is responsive to various features that serve as input to the model, e.g., some indication of sequence (like order, a time-stamp, a time delta, a binary value indicating if the event occurred within some duration of time, for instance, within a week, month, six months, or a year after some reference, such as a previous event of a particular type), and in some cases, such features include durations of time between consecutive events. In some embodiments, the features include events in the event histories described above, along with attributes of subject-entities in the subject-entity records.

In some embodiments, the subject-behavior model may be trained by optimizing (e.g., maximizing or minimizing to a local or global maximum or minimum respectively) output of some function over a space of model parameter values. The model parameters may take a variety of different forms, depending upon the type of model, examples include weights and biases in a neural network architecture, division planes and sequence of dimensions to split in a decision learning tree, transition probabilities in a dynamic Bayesian network, or policies or value functions in a reinforcement learning model. Example models include recurrent neural networks, like long-short term memory (LSTM) models, dynamic Bayesian processes, Markov decision processes, hidden Markov models, multi-layer network classifiers, reinforcement learning models, decision trees, ensemble methods thereof (like random forests) and the like, none of which is to suggest that these list items or any other list herein describes mutually exclusive categories of items.

In some embodiments, the function over which the first subject-behavior model is optimized is an objective function, which as that term in broadly used herein, in some cases may be a reward function, a value function, a cost function, a fitness function, and error function, or the like. Optimization may take a variety of different forms. Examples include gradient descent (e.g., gradient descent, mini-batch, or batch), dynamic programming optimization, genetic optimization, simulated annealing optimization, evolutionary optimization, and the like. Some embodiments may further include optimizations like classification and regression trees (CART) for decision trees, or Baum-Welch for hidden Markov models.

In some embodiments, the parameters of the subject-behavior model may be adjusted in an iterative process by which, at each epoch, the parameters are adjusted in a direction that the objective function indicates will tend to increase accuracy of the subject-behavior model in predicting subsequent events in the event records ("predicting" as used herein includes explicit prediction of events, determining that values correlate in a dataset, and implicit predictions that output an expected value from a value function without necessarily identifying the events that give rise to that value). In some embodiments, the accuracy is an accuracy in predicting a particular type of subsequent event, such as a targeted type of behavior of the subject entity, or in some cases, the accuracy is an accuracy in predicting all types of subsequent behavior in events caused by the subject entity. Thus, in some cases, the objective function indicates a direction to adjust the parameters of the model to reduce an amount of error between predicted subsequent actions of the subject entity and actual subsequent actions in the subject-entity record repository, such as a root mean square error of a collection of errors from all or a subset of the filtered records. In some cases, that direction may be indicated by a partial derivative of a parameter with respect to that error in the aggregate, in some cases for a relatively large number of parameters, like more than 100, more than 1000, or more than 10,000. In some cases, the objective function indicates a direction to adjust the parameters of the model to yield a higher value function output of the objective function, for instance in reinforcement learning implementations. In some cases, for instance with decision trees, the objective function may specify that entropy or Gini impurity on opposing sides of a division plane in the parameter space of the data is to be minimized, e.g., in an iteration of a greedy optimization according to the CART algorithm.

In some embodiments, the subject-behavior model trainer trains the model to output a value in accordance with the techniques described in U.S. patent application Ser. No. 15/456,059, titled BUSINESS ARTIFICIAL INTELLIGENCE MANAGEMENT ENGINE, the contents of which are hereby incorporated by reference.

As a result, some embodiments may produce a trained subject-behavior model, as indicated by block 28 in FIG. 1. In some embodiments, the model may input a variety of features pertaining to a subject entity, and in some cases exogenous events and previous actions, like subject-entity records. In some cases, the model may in response to such input, output scores indicating the likelihood of various types of subsequent actions by the subject entity, like likelihood of a person engaging in each of five different behaviors, likelihood of a robot navigating to a particular place, or likelihood of an industrial HVAC system in a datacenter reaching a targeted temperature, for instance conditional on various input features, like attributes and previous events. These likelihoods may be explicit (e.g., with scores mapped to different outcomes) or implicit (like in an output of a value function based on expectance of various outcomes, or in a classification according to a highest likelihood). Some embodiments may train a model operative to indicate how to cause subsequent targeted behavior of subject entities like those described in the repository 14, e.g., when AB testing is applied to the model by adding various candidate actions to existing histories to determine which candidate action produces a higher predicted likelihood of a targeted outcome. In some embodiments, the resulting model may be stored in memory, for instance, in a record specifying a model architecture, resulting values of parameters, and hyper-parameters used during training. Models may be expressed as a lookup table mapping inputs to outputs, sets of values for constants or variables in software routines, as values of parameters in closed-form equations, or combinations thereof.

In some embodiments, the trained model may then be used to generate a training set of virtual (that is, at least partially virtual, in the sense that hypothetical events are present) subject-entity records based upon candidate actions in the repository 20. To this end, some embodiments may obtain candidate actions, as indicated by block 58 of FIG. 2, for instance from the candidate action repository 20 shown in FIG. 1, by the candidate-action sequence generator 32 of FIG. 1. Sequences may be a single action or an ordered set of a plurality of actions of a type that the net-response controller 12 can cause to be effectuated.

Embodiments in some cases may then generate candidate action sequences, as indicated by block 60 of FIG. 2, for instance, by the candidate-action sequence generator 32 of FIG. 1. Some embodiments may generate the virtual subject-entity records by appending candidate actions to the subject-entity record event sequences, such as those that passed the data filter 24. In some embodiments, the full set of subject-entity records may be processed in training the subject-behavior model, while only those that passed the filter 24 are used to generate virtual subject-entity records, or vice versa. Thus, some embodiments may take a given sequence of events in a subject-entity record and add one of the candidate actions from the repository 22 to the sequence to make a virtual subject-entity record, in some cases carrying forward the other data from the subject-entity record, like attributes of the subject entity.

In some embodiments, a different virtual subject-entity record may be generated for each of the candidate actions in the repository 20 for a given subject-entity record from the repository 14. For example, if there are five candidate actions, then in some embodiments, a single subject-entity record may result in five different virtual subject-entity records, each with a different candidate action appended to its event timeseries.

In some embodiments, virtual subject entity records may be generated with multiple candidate actions appended. In some cases, candidate actions may specify a sequence of actions, for instance in a multi-action campaign, route through an environment, or cooling regimen. In some embodiments, each specified sequence of candidate actions may be appended to a given subject-entity record from the repository 14. Appending in this context refers to indicating in a version of the subject entity record that the candidate actions occur subsequent to earlier existing events in the event history. Appending can be achieved by inserting the candidate actions in an existing record or making a new copy (of all or part or a transformed version thereof) in which the candidate actions are included in this manner.

In some embodiments, a sequence of candidate actions may be appended in a variety of different permutations, for example, in every permutation or combination of candidate actions in the repository 20. In some embodiments, each subject-entity record may have appended thereto each of the different permutations to produce different virtual subject-entity records. Thus, in some cases, a relatively small number of subject-entity records in the repository 14 may be expanded to a relatively large number of virtual subject-entity records giving an inappropriately large set of candidate actions in the repository 20.

In some embodiments, the virtual subject-entity record generator 30 may ingest the result above and further insert exogenous events from the event repository 22 in the generated virtual subject-entity records. In some embodiments, the exogenous events may be inserted in a population of virtual subject-entity records that are otherwise identical, in some cases according to a probability of the exogenous events reflected in records of the event in the repository 22. For example, embodiments may stochastically insert exogenous events according to that probability. For instance, some embodiments may replicate a given virtual subject-entity records 20 times and insert an exogenous event with a probability of 5% in those 20 virtual-subject entity records, likely resulting in one of the 20 including that event. Again, insertion may be achieved by modifying an existing record or creating a new copy in which the exogenous event is included. In some embodiments, attributes of the exogenous events may be similarly sampled, for instance, timing, magnitude, and the like.

As a result, some embodiments may form virtual subject-entity records, as indicated by block 62, based upon the subject-entity records in the repository 14, the candidate actions in the repository 20, and the exogenous events in the repository 22, in some cases. These virtual subject-entity records may describe scenarios that have not occurred, and thus are virtual, but include the candidate actions in the context of known histories of events that have actually occurred. The latter property is expected to substantially reduce the space of possible subject-entity records to be explored by leveraging information in the repository 14 of possible or reasonably likely event sequences, and avoiding computation based upon sequences of events that are very unlikely to occur, particularly for a population of subject entities at issue. Thus, for example, if a particular class of robots never or nearly never circles back on a tether and impacts the tether, in a subsea application, after experiencing a current opposite its direction of travel in the preceding minute, that sequence of events may be excluded from the universe of scenarios processed in subsequent operations. Similarly, if members of a population of people rarely or never have an automobile serviced for scheduled maintenance and then purchase a new version of that automobile within a subsequent week, that sequence of events may not be processed, in some embodiments, to expedite subsequent operations by reducing the space of event sequences to be processed. Use of the terms "form" and "generate" are used broadly and use of different terms should not be read to necessarily refer to different operations in virtue of using different terminology, as both of these terms generally include causing the described thing to come into being, whether by modifying an existing thing or forming a new copy or instance.

Next, some embodiments may input the virtual subject-entity records into the trained subject-behavior model to predict responses of the subject-entities to the candidate action sequences, as indicated by block 64 in FIG. 2. In some embodiments, the virtual subject-entity records may input by the virtual subject-entity record generator 30 into the trained subject-behavior model 28 in FIG. 1. In some embodiments, the trained model may, in response, output a score indicative of a likely response of the subject entity to the input virtual candidate action sequence. For example, if a given subject-entity record has five different candidate actions appended in five different candidate action sequences, those five sequences may be input, in some cases along with attributes of the subject entity, into the trained subject-behavior model 28 to produce five different outputs indicative of responses predicted for those different sequences. Examples may include predicting a likelihood of the subject-entity engaging in targeted behavior, a most likely subsequent state of the subject entity, a value function output indicative of subsequent states of the subject entity, or the like. In some cases, the output may be one of the scores or values described in patent application Ser. No. 15/456,059, titled BUSINESS ARTIFICIAL INTELLIGENCE MANAGEMENT ENGINE, the contents of which are hereby incorporated by reference.

Some embodiments may label the input virtual subject-entity records with the predicted response or responses output from the trained model, as indicated by block 66, for instance with the model 28 in FIG. 1, by associating its output with the input in an application program interface response. Thus, some embodiments may produce a labeled training set in which the different sequences including the candidate actions are associated with predicted responses of different subject entities, and in some cases in a population thereof.

In some embodiments, this training set may be input into the induced-segmentation model trainer 34 shown in FIG. 1 to train an induced-segmentation model (36 in FIG. 1) on the labeled responses, as indicated by block 68 FIG. 2. Different types of training may be applied depending upon the type of model in use. Any of the types of models described above may be applied, and in some cases a different type of model from that selected for the subject-behavior model may be used. In some embodiments, the induced-segmentation model is policy in a reinforcement learning model that maps inputs in the stream 16 into actions to be taken, e.g., from among the candidate actions. In some embodiments, the induced-segmentation model is a classifier configured to classify subject entities specified with information in the event stream 16 into different classes depending upon how those subject-entities are predicted to respond to different candidate actions. For example, robots may be classified based upon whether applying a particular amount of thrust in a particular direction as is expected to result in the robot moving closer or further from an objective depending upon a state of a tether of the robot in subsea conditions. In another example, the segmentation model may classify people based upon whether they are expected to engage in targeted behavior (or can be influenced to do so with acceptable cost) responsive to a given one of the candidate actions, e.g., some embodiments may output a vector with dimensions corresponding to each of the candidate actions and scalar values indicative of a value or other indication of responsiveness or desirability of one or the candidate actions or sequences thereof. Thus, some embodiments may segment a population of users or customers based not merely on demographics, but on how a trained model predicts they will respond to different candidate actions in a campaign. Similarly, some embodiments may classify datacenters based upon whether the candidate actions are expected to result in an undesirable oscillating behavior of load and cooling between different datacenters, or based upon whether steady-state equilibrium is expected to occur if a given candidate action is applied.

Thus, some embodiments may account for both a current state of a subject entity, but also changes to that state expected to be induced by the candidate actions when the trained model is applied. In some embodiments, the model may be responsive to an input subject entity record in the stream 16 or subset thereof. In some embodiments, the model may score each of the different candidate actions, for instance, with a value function or function indicating a probability that a targeted behavior will be exhibited by the subject entity responsive to each of the different candidate actions, for example, producing a different score for each of the candidate actions to be output. Or some embodiments may select one of the candidate actions, for instance, that scored highest in such a score. In some cases, such selection of candidate actions may also serve as a type of segmentation or classification, by the act of mapping the action to the subject entity in the given state reflected in the stream 16, thereby segmenting that subject entity in a class of subject entities for which that candidate action is appropriate.

In some embodiments, an induced-segmentation model trained by block 34 in operation 68 is a recurrent neural network (like a LSTM model) or hidden Markov model configured to predict a subsequent action of the subject entity with a transition probability matrix, a neural network classifier classifying subject entities according to which candidate action is expected to yield a targeted behavior, a dynamic Bayesian network configured to predict the subsequent behavior, or a reinforcement learning model (or policy thereof) (like in a Markov decision process) configured to predict or respond to value from the subject entity behavior. Any of the above-described training operations appropriate for the selected model may be applied, including gradient descent, dynamic programming techniques, genetic algorithms, evolutionary algorithms, CART, simulated annealing, Baum-Welch, and the like. In some embodiments, the training technique may be configured to iteratively adjust parameters of the induced segmentation model in a direction that an objective function indicates will tend to improve accuracy of the induced segmentation model in predicting the labels in the virtual training set given the inputs to the trained subject-behavior model 28. Predicting may include selecting a candidate action indicated to be relatively high value by a value function of a reinforcement learning process (e.g., by the first trained model 28), minimizing an aggregate measure of error across the virtual training set in the prediction of the labels, reducing a measure of entropy or Gini impurity in decision tree dimensional splits, or the like.

In some embodiments, the induced-segmentation model is trained to predict (either explicitly or implicitly through some value based thereon) the labels based upon a subset of the information input into the trained subject-behavior model 28. That is, some embodiments of model 36 in FIG. 1 may take as input a subset of the features upon which the model 28 operates. For example, some embodiments may input the attributes of the subject entities, but exclude the time series of events associated therewith. This technique may be used, for example, when a timeseries is not available for new subject entities in the event stream 16, but attributes are available. Or some embodiments may apply both approaches to produce two induced-segmentation models suitable for different inputs and select among these models based on whether the fuller suite of information is available.

In some embodiments, the induced-segmentation model 36 may be an unsupervised machine learning model, for instance in cases in which the permutations of candidate actions in the repository 20 are relatively large. Some embodiments may apply a word2vec approach in which sequences of candidate actions are mapped to vectors in a reduced dimensional space (relative to that of the space of candidate actions). Some embodiments may learn structure from the set of labeled responses, for instance by clustering the outputs of the train subject-behavior model 28. In some embodiments, the clustering may be a density-based clustering, such as DB-SCAN, performed within a vector space having dimensions corresponding to candidate actions in designated sequence positions and the labeled result. As a result, some embodiments are expected to reveal different sequences of candidate actions that produce similar results for similar types of inputs. Such models may be applied by mapping a input in the stream 16 (of FIG. 1) to one of the clusters (e.g., that with a closest centroid, that with a smallest cosine distance, that with a closest Euclidian, Levenshtein or Minkowski distance, or that within which the input vector falls within a convex hull) and, then, select a candidate action from among those applied to other data points within the cluster.

Some embodiments may store the resulting induced-segmentation model in memory, as indicated by block 70, for instance, an instantiation of the trained induced-segmentation model 36 shown in FIG. 1. As noted, trained models may be expressed as a lookup table mapping inputs to outputs, sets of values for constants or variables in software routines, as values of parameters in closed-form equations, or combinations thereof.

In some embodiments, that model may be subsequently used to map state of a subject entity to responsive actions. To this end, some embodiments may receive subject events, as indicated by block 72 in FIG. 2, for instance, with the model 36 from the subject-entity event stream 16 in FIG. 1. Next, some embodiments may select an action, for instance, from among the candidate actions in the repository 20, with the trained induced-segmentation model, such as with the model 36 in FIG. 1, based upon the received input, as indicated by block 74 in FIG. 2. In some embodiments, the selected action may be that corresponding to a classification, for instance, the subject entity may be classified into a segment or group of subject entities for which a selected action is expected to produce a targeted behavior. Or in some embodiments, the selected action may be that action predicted by a value function to produce a largest aggregate value, for example. Some embodiments may then execute the selected action, as indicated by block 76 in FIG. 2, for instance with one of the action-channel servers 18 in FIG. 1.

In some embodiments, the scale of subject entities undergoing processing, either in online or offline training or model use, may be relatively large as noted above, and in some use cases, latency constraints may be relatively severe. For such use cases, some embodiments may implement the above techniques in an elastically scalable, fault-tolerate compute cluster that concurrently processes inputs. For instance, some embodiments may train the model 28 or the model 30 or both using the same, overlapping, or different compute clusters. The compute cluster may include a plurality of compute nodes (such as more than 5, more than 50, or more than 500) that operate concurrently on the input data. Some embodiments may store program state in a resilient distributed dataset (e.g., a distributed data structure in which data is replicated on two or more or three or more nodes of the compute cluster). In some cases, operations are implemented in a MapReduce framework in which the data is distributed and mapping and reducing operations are iteratively applied (e.g., in each iteration of training). Examples include Apache Spark™ or Hadoop™ (e.g., for training), Apache Flink™ or Storm™ (e.g., for model application and online learning).

In some embodiments, model training may be expedited with non-von Neumann computing architectures. For instance, some embodiments may compute transition probability matrices, entropy or Gini impurities in candidate decision tree splits, or partial derivatives of model parameters concurrently with different shaders of a graphical processing unit or a tensor processing unit. In some embodiments, the compute nodes of the cluster include an application specific integrated circuit (e.g., an AI co-processor ASIC) that cooperates with a physically separate or integrated central processing unit to optimize model parameters based on training data in the manner described herein. In some cases, the ASIC may include a relatively large number (e.g., more than 500) arithmetic logic units configured to operate concurrently on data. In some cases, the ALU's may be configured to operate on relatively low-precision data (e.g., less than or equal to 16 bits, 8 bits, or 4 bits) to afford more parallel computing units per unit area of chip substrate. In some cases, the AI co-processor ASIC may have an independent interface (relative to the CPU) to memory, and in some cases, independent memory from that accessed by the CPU. In some cases, the interface may be to High Bandwidth Memory (HBM), e.g., as specified by the JEDEC HBM2 specification, that includes a 3-dimensional stack of dynamic random-access memory. In some cases, the memory accessed by the AI-co-processor ASIC may be packed in a multi-chip package with such a 3-dimensional stack of memory, e.g., on a shared package substrate that connects to the CPU via a system board.

Figure 3:
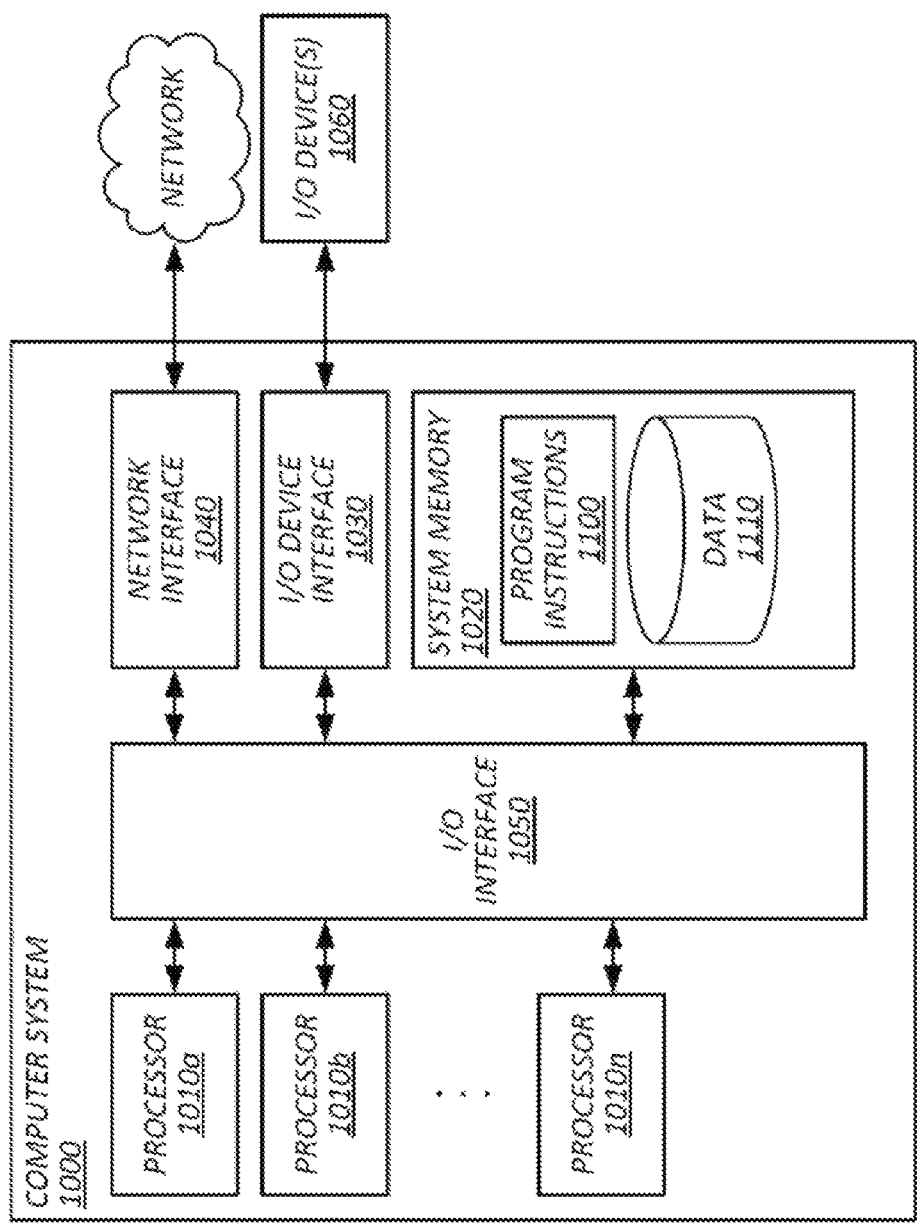
FIG. 3 shows an example of a computing device by which the above-describe techniques may be implemented.

FIG. 3 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010*a*-1010*n*) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010*a*), or a multi-processor system including any number of suitable processors (e.g., 1010*a*-1010*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a datacenter, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a datacenter or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

1. A tangible, non-transitory, machine-readable medium storing instructions that when executed by one or more processors effectuate operations comprising: obtaining, with one or more processors, a first training dataset, wherein: the first training dataset comprises a plurality of subject-entity records, the subject-entity records each describe a different subject entity, each subject entity is a different member of a first population of entities that have interacted over time with an actor entity, each subject-entity record describes attributes of a respective subject entity among the first population, each subject-entity record describes a time-series of events involving a respective subject entity among the first population, the events are distinct from the attributes, at least some of the events are action events that are caused by the actor entity, and at least some of the events are subject responses that are caused by a respective subject entity among the first population; training, with one or more processors, a first machine-learning model on the first training dataset by adjusting parameters of the first machine-learning model to optimize a first objective function that indicates an accuracy of the first machine-learning model in predicting subsequent events in the time-series given prior events in the time-series and given attributes of subject entities among the first population; obtaining, with one or more processors, a set of candidate action sequences including candidate action events to be potentially caused by the actor entity, the set including a plurality of different candidate action sequences; forming, with one or more processors, virtual subject-entity records by appending the set of candidate action sequences to time-series of at least some of the subject-entity records, wherein: a given subset of the virtual subject-entity records includes a plurality of virtual-subject entity records that each include at least part of a time-series from the same subject-event record in the first training dataset, and at least some of the plurality of virtual-subject entity records in the given subset each have a different member of the set of candidate action sequences appended to the at least part of the time-series from the same subject-event record in the first training dataset; forming, with one or more processors, a second training dataset by: predicting responses of the subject entities to at least some of the set of candidate action sequences with the trained first machine-learning model based on the virtual subject-entity records; and associating subject entities or attributes thereof with corresponding predicted responses in the second training dataset; training, with one or more processors, a second machine-learning model on the second training dataset by adjusting parameters of the second machine-learning model to optimize a second objective function that indicates an accuracy of the second machine-learning model in predicting the predicted responses in the second training set given attributes of subject entities corresponding to the predicted responses; and storing, with one or more processors, the adjusted parameters of the trained second machine-learning model in memory.

2. The medium of embodiment 1, wherein: the predicted responses account for both positive and negative utility attributed by the actor entity to predicted responses of subject entities.

3. The medium of any of embodiments 1-2, wherein: the operations comprise forming a plurality of groups by grouping members of a second population based on predicted responses to the candidate action sequences determined with the second machine-learning model based on attributes of members of the second population, the second population being either entirely different from the first population or sharing members with the first population.

4. The medium of embodiment 3, wherein: at least some of the groups include members absent from the first population and for which grouping is performed based on attributes of the members without data describing previous interactions by the members with the actor entity; and features to which the second trained machine learning model is responsive are a subset of features to which the first trained machine learning model is responsive.

5. The medium of any of embodiments 1-4, wherein: the trained first machine-learning model is configured to predict responses of subject entities given previous time-series of events and attributes of the subject entities; the previous time-series of events include exogenous events that are distinct from attributes of subject entities; and the trained second machine-learning model is configured to classify subject entities based on which of the candidate action sequences are predicted by the trained first-machine learning model to cause or be correlated with a targeted outcome.

6. The medium of embodiment 5, wherein the operations comprise: obtaining a plurality of scenarios in which different exogenous events occur; for a given one of the candidate action sequences, for the given subset of the virtual subject-entity records, forming a plurality of virtual subject-entity records each corresponding to a different one of the scenarios.

7. The medium of embodiment 6, wherein: different ones of the scenarios are weighted according to a respective probability of the respective scenario occurring in calculations based on the second objective function.

8. The medium of any of embodiments 1-7, wherein the operations comprise: obtaining a third objective function indicating an aggregate utility of the actor entity to predicted subject responses and of causing action events; and iteratively, through a plurality of iterations, adjusting the set of candidate action sequences based on the predicted responses from the trained first machine-learning model to optimize a response of the third objective function to the predicted responses.

9. The medium of any of embodiments 1-8, wherein: the first machine learning model comprises a Hidden Markov model.

10. The medium of any of embodiments 1-8, wherein: the first machine learning model comprises a long short-term memory model.

11. The medium of any of embodiments 1-8, wherein: the first machine learning model comprises a dynamic Bayesian network.

12. The medium of any of embodiments 1-11, wherein: the second machine learning model comprises a neural network classifier.

13. The medium of any of embodiments 1-8, wherein: the first machine learning model is part of a value function or an environment model of a reinforcement learning model; and the second machine learning model is a policy of the reinforcement learning model.

14. The medium of any of embodiments 1-12, wherein: the second machine learning model is an unsupervised model configured to translate inputs into a vector representation that maps to a candidate action.

15. The medium of any of embodiments 1-11, wherein: the second trained machine learning model is a random decision forest model that includes a plurality of weighted trained decision trees.

16. The medium of any of embodiments 1-11, wherein: the second trained machine learning model is a gradient-boosted trees model that includes a plurality of weighted trained decision trees.

17. The medium of any of embodiments 1-16, wherein obtaining the set of candidate action sequences comprises: generating sequences of events including the candidate action events and intermediate predicted subject responses by constraining the generated sequences based on sequences of events that occur in the first training dataset.

18. The medium of embodiment 15, wherein constraining the generated sequences based on sequences of events that occur in the first training dataset comprises: extracting sequences of events from the time-series in the first training dataset in response to determining that the extracted sequences of events lead to a targeted outcome in the first training dataset.

19. The medium of any of embodiments 1-18, wherein: the first population comprises more than 100,000 different subject-entity records; the subject-entity records have time-series that average more than 10 events in the first training dataset; the candidate action sequences include more than 5 types of actions; the first or the second machine learning model executes on a compute cluster having a plurality of computing devices that collectively perform in-memory cluster computing program state upon which the first or the second machine learning model operates is stored in an in-memory, immutable, distributed dataset spread over a plurality of nodes of the compute cluster such that the distributed dataset is resilient to failure of a given one of the computing devices; and the compute cluster concurrently processes data in the distributed dataset to apply or train the first or the second machine learning model.

19. A method, comprising: the operations of any one of embodiments 1-18.

20. A system, comprising: one or more processors; and memory storing instructions that when executed by the processors cause the processors to effectuate operations comprising: the operations of any one of embodiments 1-18

What is claimed is:

1. A tangible, non-transitory, machine-readable medium storing instructions that when executed by one or more processors effectuate operations comprising:
  obtaining, with one or more processors, a first training dataset, wherein:
    the first training dataset comprises a plurality of subject-entity records,
    the subject-entity records each describe a different subject entity,
    each subject entity is a different member of a first population of entities that have interacted over time with an actor entity,
    each subject-entity record describes attributes of a respective subject entity among the first population,
    each subject-entity record describes a time-series of events involving a respective subject entity among the first population,
    the events are distinct from the attributes,
    at least some of the events are action events that are caused by the actor entity, and
    at least some of the events are subject responses that are caused by a respective subject entity among the first population;
  training, with one or more processors, a first machine-learning model on the first training dataset by adjusting parameters of the first machine-learning model to optimize a first objective function that indicates an accuracy of the first machine-learning model in predicting subsequent events in the time-series given prior events in the time-series and given attributes of subject entities among the first population;
  obtaining, with one or more processors, a set of candidate action sequences including candidate action events to be potentially caused by the actor entity, the set including a plurality of different candidate action sequences;
  forming, with one or more processors, virtual subject-entity records by appending the set of candidate action sequences to time-series of at least some of the subject-entity records, wherein:
    a given subset of the virtual subject-entity records includes a plurality of virtual-subject entity records that each include at least part of a time-series from the same subject-event record in the first training dataset, and
    at least some of the plurality of virtual-subject entity records in the given subset each have a different member of the set of candidate action sequences appended to the at least part of the time-series from the same subject-event record in the first training dataset;

forming, with one or more processors, a second training dataset by:
predicting responses of the subject entities to at least some of the set of candidate action sequences with the trained first machine-learning model based on the virtual subject-entity records; and
associating subject entities or attributes thereof with corresponding predicted responses in the second training dataset;

training, with one or more processors, a second machine-learning model on the second training dataset by adjusting parameters of the second machine-learning model to optimize a second objective function that indicates an accuracy of the second machine-learning model in predicting the predicted responses in the second training set given attributes of subject entities corresponding to the predicted responses; and storing, with one or more processors, the adjusted parameters of the trained second machine-learning model in memory.

2. The medium of claim 1, wherein:
the predicted responses account for both positive and negative utility attributed by the actor entity to predicted responses of subject entities.

3. The medium of claim 1, wherein:
the operations comprise forming a plurality of groups by grouping members of a second population based on predicted responses to the candidate action sequences determined with the second machine-learning model based on attributes of members of the second population, the second population being either entirely different from the first population or sharing members with the first population.

4. The medium of claim 3, wherein:
at least some of the groups include members absent from the first population and for which grouping is performed based on attributes of the members without data describing previous interactions by the members with the actor entity; and
features to which the second trained machine learning model is responsive are a subset of features to which the first trained machine learning model is responsive.

5. The medium of claim 1, wherein:
the trained first machine-learning model is configured to predict responses of subject entities given previous time-series of events and attributes of the subject entities;
the previous time-series of events include exogenous events that are distinct from attributes of subject entities; and
the trained second machine-learning model is configured to classify subject entities based on which of the candidate action sequences are predicted by the trained first-machine learning model to cause or be correlated with a targeted outcome.

6. The medium of claim 5, wherein the operations comprise:
obtaining a plurality of scenarios in which different exogenous events occur;
for a given one of the candidate action sequences, for the given subset of the virtual subject-entity records, forming a plurality of virtual subject-entity records each corresponding to a different one of the scenarios.

7. The medium of claim 6, wherein:
different ones of the scenarios are weighted according to a respective probability of the respective scenario occurring in calculations based on the second objective function.

8. The medium of claim 1, wherein the operations comprise:
obtaining a third objective function indicating an aggregate utility of the actor entity to predicted subject responses and of causing action events; and
iteratively, through a plurality of iterations, adjusting the set of candidate action sequences based on the predicted responses from the trained first machine-learning model to optimize a response of the third objective function to the predicted responses.

9. The medium of claim 1, wherein:
the first machine learning model comprises a Hidden Markov model.

10. The medium of claim 1, wherein:
the first machine learning model comprises a long short-term memory model.

11. The medium of claim 1, wherein:
the first machine learning model comprises a dynamic Bayesian network.

12. The medium of claim 1, wherein:
the second machine learning model comprises a neural network classifier.

13. The medium of claim 1, wherein:
the first machine learning model is part of a value function or an environment model of a reinforcement learning model; and
the second machine learning model is a policy of the reinforcement learning model.

14. The medium of claim 1, wherein:
the second machine learning model is an unsupervised model configured to translate inputs into a vector representation that maps to a candidate action.

15. The medium of claim 1, wherein:
the second trained machine learning model is a random decision forest model that includes a plurality of weighted trained decision trees.

16. The medium of claim 1, wherein:
the second trained machine learning model is a gradient-boosted trees model that includes a plurality of weighted trained decision trees.

17. The medium of claim 1, wherein obtaining the set of candidate action sequences comprises:
generating sequences of events including the candidate action events and intermediate predicted subject responses by constraining the generated sequences based on sequences of events that occur in the first training dataset.

18. The medium of claim 15, wherein constraining the generated sequences based on sequences of events that occur in the first training dataset comprises:
extracting sequences of events from the time-series in the first training dataset in response to determining that the extracted sequences of events lead to a targeted outcome in the first training dataset.

19. The medium of claim 1, wherein:
the first population comprises more than 100,000 different subject-entity records;
the subject-entity records have time-series that average more than 10 events in the first training dataset;
the candidate action sequences include more than 5 types of actions;

the first or the second machine learning model executes on a compute cluster having a plurality of computing devices that collectively perform an in-memory cluster computing program state upon which the first or the second machine learning model operates is stored in an in-memory, immutable, distributed dataset spread over a plurality of nodes of the compute cluster such that the distributed dataset is resilient to failure of a given one of the computing devices; and the compute cluster concurrently processes data in the distributed dataset to apply or train the first or the second machine learning model.

20. The medium of claim 1, wherein:

training the first machine-learning model comprises steps for training a supervised time-series forecasting model; and training the second machine-learning model comprises steps for training a supervised classification model.

21. The medium of claim 1, wherein:

the operations comprise steps for causing subject entities to respond in a targeted manner based on a trained model.

22. A method, comprising:

obtaining, with one or more processors, a first training dataset, wherein:

the first training dataset comprises a plurality of subject-entity records, the subject-entity records each describe a different subject entity, each subject entity is a different member of a first population of entities that have interacted over time with an actor entity, each subject-entity record describes attributes of a respective subject entity among the first population, each subject-entity record describes a time-series of events involving a respective subject entity among the first population, the events are distinct from the attributes, at least some of the events are action events that are caused by the actor entity, and at least some of the events are subject responses that are caused by a respective subject entity among the first population;

training, with one or more processors, a first machine-learning model on the first training dataset by adjusting parameters of the first machine-learning model to optimize a first objective function that indicates an accuracy of the first machine-learning model in predicting subsequent events in the time-series given prior events in the time-series and given attributes of subject entities among the first population;

obtaining, with one or more processors, a set of candidate action sequences including candidate action events to be potentially caused by the actor entity, the set including a plurality of different candidate action sequences;

forming, with one or more processors, virtual subject-entity records by appending the set of candidate action sequences to time-series of at least some of the subject-entity records, wherein:

a given subset of the virtual subject-entity records includes a plurality of virtual-subject entity records that each include at least part of a time-series from the same subject-event record in the first training dataset, and at least some of the plurality of virtual-subject entity records in the given subset each have a different member of the set of candidate action sequences appended to the at least part of the time-series from the same subject-event record in the first training dataset;

forming, with one or more processors, a second training dataset by:

predicting responses of the subject entities to at least some of the set of candidate action sequences with the trained first machine-learning model based on the virtual subject-entity records; and associating subject entities or attributes thereof with corresponding predicted responses in the second training dataset;

training, with one or more processors, a second machine-learning model on the second training dataset by adjusting parameters of the second machine-learning model to optimize a second objective function that indicates an accuracy of the second machine-learning model in predicting the predicted responses in the second training set given attributes of subject entities corresponding to the predicted responses; and storing, with one or more processors, the adjusted parameters of the trained second machine-learning model in memory.

* * * * *